(12) United States Patent
Kristiansen et al.

(10) Patent No.: US 9,188,256 B2
(45) Date of Patent: Nov. 17, 2015

(54) FLEXIBLE UNBONDED OIL PIPE SYSTEM WITH AN OPTICAL FIBER SENSOR INSIDE

(75) Inventors: Mikael Kristiansen, Hellerup (DK); Nicky Weppenaar, Copenhagen K (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 711 days.

(21) Appl. No.: 13/499,974

(22) PCT Filed: Oct. 5, 2010

(86) PCT No.: PCT/DK2010/050252
§ 371 (c)(1),
(2), (4) Date: May 15, 2012

(87) PCT Pub. No.: WO2011/042023
PCT Pub. Date: Apr. 14, 2011

(65) Prior Publication Data
US 2012/0222770 A1    Sep. 6, 2012

Related U.S. Application Data

(60) Provisional application No. 61/248,646, filed on Oct. 5, 2009.

(30) Foreign Application Priority Data

Oct. 5, 2009   (DK) ................................. 2009 01086
Oct. 27, 2009  (DK) ................................. 2009 01157

(51) Int. Cl.
*F16L 55/00*      (2006.01)
*F16L 11/08*      (2006.01)
(Continued)

(52) U.S. Cl.
CPC ................ *F16L 11/08* (2013.01); *F16L 11/12* (2013.01); *G01D 5/35316* (2013.01); *G01L 11/025* (2013.01)

(58) Field of Classification Search
CPC .............. F16L 55/10; F16L 9/14; F16L 11/00
USPC .......................... 138/104, 134–135, 148, 174
See application file for complete search history.

(56) References Cited

U.S. PATENT DOCUMENTS

| 4,549,581 A | 10/1985 | Unno et al. |
| 5,625,178 A | 4/1997 | Rojey |

(Continued)

FOREIGN PATENT DOCUMENTS

| EP | 1119684 A1 | 8/2001 |
| EP | 1255944 A1 | 11/2002 |

(Continued)

OTHER PUBLICATIONS

Schroeder, et al., "High Pressure and Temperature Sensing for the Oil Industry Using Fiber Bragg Gratings Written onto Side Hole Single Mode Fiber", SPIE Proceedings, vol. 3746, p. 42, 1999.

(Continued)

*Primary Examiner* — Paul R Durand
*Assistant Examiner* — Andrew P Bainbridge
(74) *Attorney, Agent, or Firm* — Pearne & Gordon LLP (57) ABSTRACT

The invention relates to an unbonded flexible pipe comprising an internal sheath, at least one armor layer surrounding said internal sheath and a bore defined by said internal sheath, the flexible pipe further comprising a fiber sensor arranged in said bore. By arranging the fiber in the bore of the unbounded flexible pipe, new opportunities for sensing desired properties of the unbounded flexible pipe is provided. The fiber sensor may preferably be a pressure fiber sensor. The unbonded flexible pipe may preferably be an offshore pipe, such as a riser for transportation of hydrocarbons.

21 Claims, 7 Drawing Sheets

(51) Int. Cl.
*F16L 11/12* (2006.01)
*G01D 5/353* (2006.01)
*G01L 11/02* (2006.01)

(56) References Cited

U.S. PATENT DOCUMENTS

| | | | |
|---|---|---|---|
| 5,646,401 A * | 7/1997 | Udd | 250/227.18 |
| 5,730,188 A | 3/1998 | Kalman et al. | |
| 5,813,439 A * | 9/1998 | Herrero et al. | 138/134 |
| 5,841,131 A * | 11/1998 | Schroeder et al. | 250/227.17 |
| 5,864,641 A | 1/1999 | Murphy et al. | |
| 5,998,681 A | 12/1999 | Rojey | |
| 6,110,550 A | 8/2000 | Jarrin et al. | |
| 6,123,114 A * | 9/2000 | Seguin et al. | 138/124 |
| 6,145,546 A | 11/2000 | Hardy et al. | |
| 6,192,941 B1 | 2/2001 | Mallen-Herrero et al. | |
| 6,283,161 B1 | 9/2001 | Feret et al. | |
| 6,354,333 B1 | 3/2002 | Dupoiron et al. | |
| 6,363,180 B1 | 3/2002 | Yamate et al. | |
| 6,408,891 B1 | 6/2002 | Jung et al. | |
| 6,422,084 B1 * | 7/2002 | Fernald et al. | 73/705 |
| 6,454,897 B1 | 9/2002 | Morand | |
| 6,668,866 B2 | 12/2003 | Glejbol et al. | |
| 6,668,867 B2 | 12/2003 | Espinasse et al. | |
| 6,691,743 B2 | 2/2004 | Espinasse | |
| 7,047,816 B2 * | 5/2006 | Jones et al. | 73/729.1 |
| 7,279,052 B2 | 10/2007 | Kinnari et al. | |
| 2004/0112596 A1* | 6/2004 | Williams et al. | 166/250.03 |
| 2004/0245444 A1* | 12/2004 | MacDougall | 250/231.19 |
| 2010/0229662 A1* | 9/2010 | Brower | F16L 59/141 73/865.8 |

FOREIGN PATENT DOCUMENTS

| | | |
|---|---|---|
| EP | 1269057 A1 | 1/2003 |
| EP | 1269058 A1 | 1/2003 |
| EP | 1277007 A1 | 1/2003 |
| EP | 1384026 A1 | 1/2004 |
| EP | 1475650 A1 | 11/2004 |
| EP | 1937751 A1 | 7/2008 |
| EP | 2065551 A2 | 6/2009 |
| FR | 2926347 A1 | 7/2009 |
| WO | 99/13307 A1 | 3/1999 |
| WO | 99/64781 A1 | 12/1999 |
| WO | 00/17479 A1 | 3/2000 |
| WO | 00/36324 A1 | 6/2000 |
| WO | 01/51839 A1 | 7/2001 |
| WO | 01/61231 A1 | 8/2001 |
| WO | 01/61232 A1 | 8/2001 |
| WO | 01/81809 A1 | 11/2001 |
| WO | 02/42674 A1 | 5/2002 |
| WO | 02/088659 A2 | 11/2002 |
| WO | 02/090818 A1 | 11/2002 |
| WO | 2007/003876 A1 | 1/2007 |
| WO | 2007/042049 A1 | 4/2007 |
| WO | 2008/113362 A1 | 9/2008 |
| WO | 2009/056623 A1 | 5/2009 |
| WO | 2009/106078 A1 | 9/2009 |

OTHER PUBLICATIONS

"Recommended Practice for Flexible Pipe", API 17 B 2005, 4th Edition, Jul. 1, 2008.

* cited by examiner

FLEXIBLE UNBONDED OIL PIPE SYSTEM WITH AN OPTICAL FIBER SENSOR INSIDE

TECHNICAL FIELD

The present invention relates to a flexible unbonded pipe and a flexible pipe system for the transport of hydrocarbons, such as transport of hydrocarbons to or from offshore installations, for example comprising transporting hydrocarbons under sea level.

BACKGROUND ART

Flexible pipes for transportation of hydrocarbons are well known in the art. In this text the term "unbonded" means that at least two of the layers of the pipe are not bonded to each other. Often unbonded flexible pipes comprise an internal sheath (often called an inner liner) which forms a barrier against the outflow of the fluid which is conveyed through the pipe, and one or more armoring layers on the outer side of the internal sheath (outer armoring layer(s)). The flexible pipe may comprise additional layers such as a carcass which is an internal armoring layer to prevent the collapse of the internal sheath. An outer sheath may be provided with the object of forming a barrier against the ingress of fluids from the pipe surroundings to the armoring layers. Often the pipe will comprise at least two armoring layers which are not bonded to each other directly or indirectly via other layers along the pipe. Thereby the pipe becomes bendable and sufficiently flexible to roll up for transportation.

The above-mentioned type of flexible pipes is used, among other things, for off-shore as well as some on-shore applications for the transport of fluids and gases. Flexible pipes can e.g. be used for the transportation of fluids where very high or varying pressures exist along the longitudinal axis of the pipe, such as riser pipes which extend from the seabed up to an installation on or near the surface of the sea, pipes for transportation of liquid and gases between installations, pipes which are located at great depths on the seabed, or pipes between installations near the surface of the sea.

A problem often observed when transporting hydrocarbons is the formation of hydrates, in particular hydrates of relatively small hydrocarbons, such as methane. Also gases such as $CO_2$ and $H_2S$ may form hydrates. These hydrates are often referred to as clathrate hydrates. The formation of clathrate hydrates takes place at suitable temperatures and pressures, depending on the fluid transported. Clathrate hydrates are not chemical compounds as the sequestered molecules are never bonded to the lattice. Their detailed formation and decomposition mechanisms on a molecular level are still not well understood. The clathrate hydrates may deposit within the pipe and form plugs. It has been found that by keeping the pressure within the pipe relatively low, the formation of hydrates may be reduced, however, simultaneously the hydrocarbon flow and thereby the amount of fluid pumped through the pipe will be reduced accordingly.

In U.S. Pat. No. 5,625,178 and U.S. Pat. No. 5,998,681 are described processes for preventing the formation of hydrates by subjecting the fluid to pulses of electromagnetic waves.

In U.S. Pat. No. 7,279,052 is described a method of removing deposited hydrates from a pipeline by inserting a thrusters pig.

EP 2 065 551 describes a flexible pipe with two or more optical fiber strain sensors incorporated in the internal sheath or helically wound around the internal sheath. Based on these fiber strain sensors a pressure in the bore of the pipe can—in according to EP 2 065 551—be calculated.

A flexible pipe of the type in question has an elastic working interval where the forces pulling in the length direction are in balance (pulling forces) with the pressure difference between the inside of the pipe (the bore) and the pressure acting in the outer side of the pipe (delta bore pressure). In this elastic working interval the pipe will be elongated when the pulling forces exceed the delta bore pressure and visa verse—such variations may be detected by the optical fiber strain sensors of EP 2 065 551 and are generally measured by measuring the hoop stress. However, since a flexible pipe in use will be subjected to a plurality of different and varying forces which will cause the pipe to move and flex, the optical fiber strain sensors will pick up large amounts of signal variations which are unrelated to changes in bore pressure and need to be filtered out subsequently. Though the optical fiber strain sensors may provide measurements which can detect local formations of blockages, it is very difficult to determine the actual pressure within the bore to a sufficient degree of accuracy to avoid formation of hydrate. Furthermore, a large number of fiber strain sensors arranged in different pitches will be required along the entire pipe length.

The object of the invention is to provide an unbonded pipe by use of which it is possible to optimize high hydrocarbon flow while minimizing or eliminating hydrate formation. This object has been achieved by the invention as claimed. Other benefits and improvements of embodiments of the invention will be clear to a skilled person from the description and example given below.

THE INVENTION

The unbonded flexible pipe of the invention comprises an internal sheath, at least one armor layer surrounding the internal sheath and a bore defined by the internal sheath and the flexible pipe further comprises a fiber sensor arranged in the bore.

It should be understood that not all of the fiber sensor need be arranged in the bore, but merely the part of the fiber which performs the actual sensing part. Other parts of the fiber sensor, such as some of the fiber, analytical elements and pumping light for the fiber sensor need not and will often not be arranged in the bore of the unbonded flexible pipe, but will be connected to the fiber sensing part of the fiber in the bore e.g. via the fiber. By arranging parts of the sensor, such as analytical elements and pumping light, outside the flexible pipe, it is possible to avoid having electricity inside the pipe and thereby any risk of igniting liquid in the flexible pipe can be reduced or even avoided.

Furthermore the size or sizes of such analytical elements and pumping light may render arrangement inside the pipe difficult.

The layers of the flexible pipe of the invention such as the internal sheath and layers surrounding the internal sheath may be as described above and for example as known from the prior art. Also as described above the flexible pipe may in one embodiment comprise a carcass.

The flexible pipe of the invention may for example have a structure as described in any one of the prior art documents EP 1255944, EP 1269057, EP 1384026, EP 1475650, EP 1277007, 1269058, EP 1119684, U.S. Pat. No. 6,123,114, U.S. Pat. No. 6,691,743, U.S. Pat. No. 6,668,867, U.S. Pat. No. 5,813,439, WO 0242674, U.S. Pat. No. 5,730,188, U.S. Pat. No. 6,354,333, U.S. Pat. No. 4,549,581, U.S. Pat. No. 6,192,941, U.S. Pat. No. 6,283,161, WO 0181809, WO 0036324, U.S. Pat. No. 6,454,897, U.S. Pat. No. 6,408,891 and U.S. Pat. No. 6,110,550, WO2009106078, WO 2008113362, EP1937751, U.S. Pat. No. 6,145,546, U.S. Pat.

No. 6,123,114 and U.S. Pat. No. 6,668,866 with the difference that the flexible pipe further comprises a fiber sensor arranged in the bore.

The bore is sometimes also referred to as the flow channel. The bore is defined by the internal sheath, i.e. the inner surface of the innermost liquid impermeable layer which forms a barrier against the outflow of the fluid which is conveyed through the pipe. In case the internal sheath comprises a film layer applied innermost, the inner surface of such film layer constitutes the surface that defines the bore. Accordingly the bore is the cavity which is surrounded by and within the inner surface of the internal sheath, and elements surrounded by the inner surface of the internal sheath are elements within the bore.

Further information about the individual layers of the flexible pipe may be found in "Recommended Practice for Flexible Pipes, API 17 B 2005, 4$^{th}$ edition 1 Jul. 2008" "Specification for Unbonded Flexible Pipe 17J, Nov. 1, 1999" or any updated versions thereof.

The above-mentioned type of flexible pipes is used, among other things, for off-shore as well as some on-shore applications for the transport of fluids and gases. Flexible pipes can e.g. be used for the transportation of fluids where very high or varying water pressures exist along the longitudinal axis of the pipe, such as riser pipes which extend partly or totally from the seabed up to an installation on or near the surface of the sea, pipes for transportation of liquid and gases between installations, pipes which are located at great depths on the seabed, or between installations near the surface of the sea. Such pipes are herein also referred to as harvesting pipes.

In one embodiment the flexible pipe of the invention comprises at least one pressure armor layer formed from helically wound wire or wires which is/are wound with a relative short pitch such as a winding degree with respect to the pipe axis of for example about 80 degrees or more or even 90 degrees or more. Such pressure armoring layer(s) may e.g. be interlocked with itself or with neighboring wires in consecutive windings. This structure of a pressure armor is well known in the art. The flexible pipe may for example further comprise at least two armoring layers in the form of traction armor layers provided by helically wound wires with a relatively short pitch, such as a winding degree with respect to the pipe axis of about 55 degrees or less.

Such traction wires will normally be wound in opposite direction and the pitch of the layers may be equal to each other or may differ from layer to layer. In one embodiment the flexible pipe of the invention does not comprise a pressure armor. In such case the flexible pipe of the invention may comprise armor layers which can withstand both pressure and traction e.g. layers of helically wound wires with a winding degree with respect to the pipe axis of from about 30 to about 80 degrees. All the above armor layers are well known in the art and the skilled person will be able to select the type of armor layers suitable for a given flexible pipe of the invention. The armor layers may be made from polymer(s) (e.g. composite materials comprising thermoset polymer and thermoplast polymer), metal(s), fiberglass, combinations thereof as well as combinations with other materials(s).

The flexible pipe may comprise one or more barrier sheaths. A barrier sheath should herein be understood to mean a sheath which forms a resistance or a barrier against passage of a liquid fluid and/or a gas fluid, such that a different fluid composition can be maintained on the respective sides of the barrier sheath due to the barrier properties for example for at least 24 hours under ordinary conditions of use of the pipe. The barrier sheaths will typically not provide a complete barrier against gas flow, but often it is preferred that the barrier sheaths provide at least a resistance against passage of gas. The barrier sheaths preferably form at least a resistance against hydrocarbons and/or sea water and/or one or more types of gas, such as oxygen, methane, hydrogen sulphides and carbon dioxides.

The pipe may comprise one or more flexible film or foil layers such as it is generally known in the art of flexible pipes. It is preferred that at least one of said one or more flexible film or foil layers forms a resistance or barrier against fluid. In one embodiment an annular fluid cavity is provided between such two barrier layers selected from barrier sheaths and foil/film barrier layers.

A foil layer means a layer of a metallic or metal containing material which is sufficiently flexible such that it does not significantly increase the total stiffness of the pipe. A film layer means a layer comprising a polymeric matrix in a layer, which layer is sufficiently flexible such that it does not significantly increase the total stiffness of the pipe. A foil/film barrier layer is a foil/film layer which forms at least a resistance, such as a resistance or a barrier against passage of a liquid fluid and/or a gas fluid, such that a different fluid composition can be maintained on the respective sides of the foil/film barrier layer due to the barrier properties for at least 24 hours under ordinary conditions of use of the pipe.

The foil/film barrier layer preferably forms a resistance or a barrier against hydrocarbons and/or sea water and/or one or more types of gas, such as oxygen, methane, hydrogen sulphides and carbon dioxides. According to the invention the flexible pipe comprises a fiber sensor arranged in the bore. Until the present invention it has never even been considered to apply a fiber sensor in a bore of an unbonded, flexible pipe for transportation of hydrocarbons. The fluid transported in the bore of such pipes is generally very aggressive, and strong mechanical forces reign within the bore. Accordingly it has been believed that both for chemical and for mechanical reasons a fiber sensor could not function properly within the bore and further it has been believed that the durability of such a fiber sensor in the bore of an unbonded, flexible pipe for transportation of hydrocarbons would be too short to be economically feasible.

Furthermore, so far there has not been any expectation of any benefits by applying a fiber sensor in the bore and generally is has been believed that the optimal solution in order for fiber sensors to measure various parameter including pressure was to apply the fiber sensor outside the internal sheath to thereby obtain a sensor fiber which could have a durability which would last more than a short fraction of the lifetime of a flexible pipe which is normally set to at least 20 years of operation. Until the present invention it has not even been considered to measure the pressure by a direct pressure sensitive sensor.

The inventors of the present invention have now found that the flexible pipe of the invention comprising a fiber sensor arranged in the bore of the flexible pipe actually provides a highly beneficial step in the art, including a completely new and reliable method of controlling the flow (and thereby the production) of hydrocarbons with a reduced risk of formation of blockage in the bore by formation of hydrates. The determination of the pressure within the bore can be done in a very simple and reliable way which is substantially free of any influences relating to movements and twisting of the flexible pipe.

Furthermore the inventors have found that the flexible pipe of the invention is not as sensitive as feared, and it appears that the fiber sensor within the bore of the pipe actually will have a durability which is sufficiently long to make the application of the flexible pipe of the invention feasible.

It is generally desired that the fiber sensor is or includes a pressure fiber sensor. However, the fiber sensor may be or comprise other sensors such as a temperature sensor, a velocity sensor and a chemical sensor which can detect one or more constituent in the liquid flowing in the pipe or which can detect a variation in composition (such as inhomogeneity) of the liquid flowing in the pipe.

The term 'measure' in measure/measuring a parameter e.g. pressure includes both a direct measure as well as a measurement of a related parameter by which the parameter in question can be calculated. The terms 'measure' and 'determine' are used interchangeably.

In one embodiment of the flexible pipe of the invention the fiber sensor is a pressure sensor. In one embodiment of the flexible pipe of the invention the fiber sensor is a pressure sensor and the flexible pipe further comprises one or more additional sensors such as one or more of a temperature sensor, a velocity sensor and a chemical sensor which can detect one or more constituent in the liquid flowing in the pipe or which can detect a variation in composition (such as inhomogeneity) of the liquid flowing in the pipe.

In one embodiment the flexible pipe comprises in its bore a fiber sensor in the form of a current fiber sensor selected from a direct current (DC) fiber sensor and an alternating current (AC) fiber sensor. Due to the risk of ignition of the hydrocarbons, current fiber sensors are not the preferred choice, but in certain applications they may work. Accordingly it is generally preferred that the fiber sensor is a non-electrical conducting fiber.

The fiber sensor is most preferably an optical fiber sensor. In one embodiment the fiber sensor comprises at least one grating. In order to perform a plurality of measurements along the fiber sensor, the fiber sensor preferably comprises a plurality of gratings. It is particularly preferred that the fiber sensor is a Bragg grating fiber sensor. In one embodiment the Bragg grating fiber sensor with a pi phase shift in the center shift their center wavelength in response to transverse pressure.

Bragg grating fiber sensors are well known and have for example been used in well and reservoir measurements such as described in R. J. Schroeder, T. Yamate, Eric Udd, "High Pressure and Temperature Sensing for the Oil Industry using Fiber Bragg Gratings Written onto Side Hole Single Mode Fiber," SPIE Proceedings, Vol. 3746, p. 42, 1999.

Examples of useful Bragg grating fiber sensors are the Bragg grating fiber sensors described in WO 29056623, U.S. Pat. No. 7,047,816, U.S. Pat. No. 6,422,084, U.S. Pat. No. 5,841,131 and WO 27003876.

In one embodiment the fiber sensor is an intensity based fiber sensor. Such sensor mainly bases its sensing on a determination of the intensity of one or more wavelengths or a change of one or more wavelengths of light. In many situations, an intensity based pressure sensor comprises one or more gratings, where the grating(s) is influenced by the pressure or change of pressure in the medium to be measured, in this situation inside the bore. Examples of useful intensity based fiber sensors include the fiber sensors described in US 20040245444.

In one embodiment the fiber sensor is a microbend fiber sensor which may for example be an intensity based sensor where light may be lost from an optical fiber when the bent radius of the fiber exceeds a critical angle necessary to confine the light to the core area and by exceeding the critical angle light will leak into the cladding. Microbending of the fiber locally at one or more sites along the fiber sensor can accordingly result in intensity modulation of light propagating through the optical fiber. The optical fiber sensor may be arranged such that the pressure inside the bore influences the degrees of bending in one or more microbends along the length of the flexible pipe and thereby the pressure inside the bore can be determined.

In one embodiment the fiber sensor is a spectrally based fiber sensor, such as a grating fiber sensor or an etalon fiber sensor. An example of such a fiber is disclosed in U.S. Pat. No. 5,646,401.

In one embodiment, the fiber sensor comprises a sensing fiber, such as a glass fiber, for sensing the property to be determined, and a protective coating, such as a polymer coating, surrounding said sensing fiber. The protective coating is adapted to enable a pressure acting on an outside of the protective coating to be transmitted onto the sensing fiber surrounded by said coating. In this way, the sensing fiber may be protected by the protective coating while still enabling pressure measurements to be performed by the fiber sensor.

In one embodiment the protective coating has a substantially circular outer cross section. 'Outer cross section' is in the context of this application defined to mean the intersection between an outer surface of the object and the cross-sectional plane. In this embodiment, said intersection will be substantially circular.

In alternative embodiments the protective coating may have a non-circular outer cross section.

In one embodiment, the protective coating and the sensing fiber together form a tape having an elongated outer cross section with a high aspect ratio between a shortest length direction and a longest length direction.

In one embodiment, the tape comprises two sides along the longest length direction, said two sides being substantially parallel over at least a part of the longest length direction.

In one embodiment, the tape has a thickness of from about 100% to about 2000% of an outer dimension, such as an outer diameter, of the sensing fiber, such as from about 150% to about 1000%, preferred from about 200% to about 700%, more preferred from about 300% to about 500%. The thickness of the tape is to be measured as the shortest dimension of the tape, when measured along a diameter of the sensing fiber. In the case of a non-circular sensing fiber, the thickness is to be measured as the shortest dimension of the tape when measured along a diameter of an inscribed circle in the outer cross section of the sensing fiber.

In one embodiment, the tape has a width from about 10 to about 200 times the thickness of said tape, such as from about 20 to about 150 times the thickness of the tape, or even such as from about 50 to about 120 times the thickness of the tape. The width of the tape is to be measured as the longest dimension in a cross section of the tape.

In one embodiment the fiber sensor comprises a pressure sensitive coating. An example of useful fiber sensors with a coating is described in e.g. U.S. Pat. No. 5,864,641. Another example is a fiber sensor with a long-period grating and evanescent wave interaction. The long-period grating may for example be about 100 μm or longer. The long-period grating induces coupling between core and cladding modes, such that changes in the cladding mode are coupled into the core. This can be measured as a resonant wavelength shift. The pressure sensitive coating is arranged as a part or all of the cladding. The electromagnetic waves in the fiber may in one embodiment be made to interact directly with conditions on the surface of the fiber through the fiber cladding/coating. This for example can result in changes to the refractive index which can be measured in the reflected light.

In one embodiment the fiber sensor provides or is a part of a distributed pressure sensing system. Such fiber sensor may preferably additionally be a Bragg grating fiber comprising a plurality of gratings along the length of the fiber.

In one embodiment the fiber sensor is based on a microstructure fiber also called a photonic crystal fiber (PCF). In one embodiment the PCF is a polarization-maintaining fiber allowing polarization to be maintained. Such polarization-maintaining PCF can determine additional information about conditions at a scattering point.

In one embodiment the PCF is a birefringent PCF which return different wavelengths depending on the polarization of the incoming light. This means that two wavelengths (one per polarization) can be returned from one grating. The difference in the two wavelengths is dependent on pressure and/or strain, but independent of temperature. This means that strain or pressure measurements can be made with high accuracy and absolute values without temperature compensation.

The flexible pipe may further comprise a temperature sensor. Since—as explained above—it has been found that the hydrate formation is a function of temperature and pressure within the bore, it has been highly valuable to measure both temperature and pressure in the bore. The result obtained may for example be coupled as a direct feed back to a production volume regulation system for regulating the production volume in relation to pressure or pressure and temperature to thereby optimize the balance of high production volume and low hydrate formation.

In one embodiment the flexible pipe comprises a distributed pressure sensing system with a pressure fiber sensor within the bore of the flexible pipe and a plurality of temperature sensors arranged along the flexible pipe to measure the temperature of the fluid in the bore.

In one embodiment the flexible pipe further comprises a distributed temperature sensor, the temperature sensor preferably comprising a fiber sensor arranged in the bore.

In one embodiment fiber sensor arranged in said bore comprises or is a part of a temperature sensor and a pressure sensor.

Examples of useful combined pressure and temperature sensors include the Fiber Optic Sensor System described in U.S. Pat. No. 6,363,180.

Preferably the fiber sensor arranged in said bore is arranged such that it will be in physical contact with a liquid flowing in said bore. Thereby a direct measurement can be obtained which is not mixed with other physical parameters e.g. due to bending and twisting of the flexible pipe, and accordingly the pressure or pressure and additional data e.g. temperature can be obtained with a high degree of reliability without the need of additional sensors to compensate e.g. for the bending and twisting of the flexible pipe.

By having a liquid in the bore acting directly on the fiber sensor in the bore it has been shown that a highly accurate and fast sensing of the pressure within the bore can be obtained, and by using this result the production volume of crude oil or other hydrocarbons recovered from the underground can be optimized, while avoiding unacceptable formation of hydrides.

In order to reduce risk of physical damage of the fiber sensor in the bore the fiber sensor may have fixing sites along its length and/or it may be supported by a supporting element e.g. a protecting element.

In any event the fiber sensor should still be able to bend with the flexible pipe without the risk of being damaged merely due to bending within the bending radius of the flexible pipe.

In one embodiment a protecting element is arranged around the fiber sensor. The protecting element does not completely encase the fiber sensor, but the protecting element is constructed such that it allows a liquid flowing in the bore to act directly on the fiber sensor. The protecting element may for example be a coil or a tube shaped lattice for example made from of polymer and/or metal.

Preferably the protecting element is constructed such that is allows a liquid flowing in the bore to act directly on the fiber sensor without any detectable increase or reduction in pressure compared to the overall pressure of the liquid flowing in the bore.

It is in particular preferred that the protecting element is a coil, due to the fact that such a coil actually has shown to provide a fiber sensor with a high degree of protection while simultaneously maintaining a high degree of flexibility of the fiber sensor in the coil, and furthermore such a coil can be purchased as a standard product and be easily applied in the bore of the flexible pipe.

In one embodiment the fiber sensor arranged in said bore is supported by a supporting element by being placed in an open carrier rod comprising a plurality of orifices which allow a liquid in the bore to act directly on the fiber sensor. The open carrier rod should preferably be helically wound around an axis of the flexible pipe in order to have a desired degree of flexibility to allow bending and/or twisting of the flexible pipe.

The said fiber sensor may in one embodiment have an overlength compared to the length of the flexible pipe. Thereby the risk of breaking the fiber sensor when the flexible pipe is bent or flexed may be reduced. The overlength may in one embodiment be at least about 2%, such as at least about 5% such as up to several hundred %, e.g. up to about 300% or up to about 100%. In most situations an overlength will be from about 1% in overlength to about 200% in overlength.

In one embodiment the said fiber sensor is arranged with a length direction substantially identical to a length direction of the flexible pipe. Thereby the minimum of length of fiber sensor is applied. However, it should be observed that this embodiment is not preferred in cases where the flexible pipe will be subjected to uncontrolled bending or flexing since the fiber sensor may then be damaged.

In one embodiment the fiber sensor is helically wound around an axis e.g. the centre axis of the flexible pipe. By helically winding the fiber sensor, optionally in a supporting element, the flexibility of the flexible pipe can be maintained substantially as it would be without the sensor. Furthermore the fiber sensor will generally not be subject to damage by bending and twisting of the flexible pipe within the normal bending/twisting range of the flexible pipe.

In principle the helically windings preferably have any pitch along the length of the flexible pipe. However, it has been found that by winding the fiber sensor helically with a fairly short pitch, the fiber sensor needs to be fairly long and accordingly the signal(s) measured along the length of the fiber sensor in the bore may be fairly weak or the light source will need to be a light source with a fairly high power to obtain a desirable clear signal. This will add to cost and the resulting sensing may not be optimal.

It has accordingly been found that by arranging the sensor with helically windings of a relatively long pitch, the desired flexibility and high quality signals can be obtained, while simultaneously keeping the length of fiber of the fiber sensor at a desired cost effective level.

Accordingly, in one embodiment the helically windings of the fiber sensor have a long pitch, more preferably the fiber sensor have an angle to said axis which is about 55 degrees or less or which is about 45 degrees or less or which is about 35 degrees or less and/or which is about 5 or more up to about 55 degrees.

In one embodiment the fiber sensor is placed in contact with an inner side of said internal sheath. The internal sheath optionally comprises an internal film layer in which case said fiber sensor is placed in contact with the inner side of said film layer of said internal sheath. The fiber sensor may for example be fixed to the inner side of the internal sheath at desired sites along its length e.g. every $5^{th}$ meter or less, or every $2^{nd}$ meter or less. Such fixing may be chemically (e.g. by a glue or similar) or physically (e.g. by a strap, a snap lock or similar or by both, e.g. by a fixing element glued to the inner side of the inner sheath and snap locked to the fiber sensor or a supporting element for the fiber sensor).

As mentioned above the flexible pipe may comprise an internal armoring layer (a carcass) placed in said bore on the inner side of said internal sheath. The internal armoring layer may for example be provided by helically wound reinforcement elements preferably selected from strips, wires and/or profiles which may be interlocked with each other in consecutive windings.

The carcass prevents a collapse of the internal sheath and provides mechanical protection to the internal sheath. Often it is desired to have a relatively short pitch in order to obtain a high anti-collapse strength, however, the winding angle of the helically wound element may be as low as about 30 degree relative to the center axis of the flexible pipe, and still provide good anti-collapse strength. The winding angle of the helically wound element may be from about 50 degrees to about 90 degrees relative to the center axis of the flexible pipe.

In one embodiment wherein the flexible pipe comprises an internal armoring layer placed in the bore on the inner side of said internal sheath, the internal armoring layer preferably is a layer of helically wound reinforcement element(s) which may preferably be interlocked. An internal armoring layer is not liquid impermeable and the pressure in a liquid in the bore can pass in between the helically wound reinforcement element(s) of the armoring layer such that pressure in the liquid between the helically wound reinforcement element(s) of the armoring layer is essentially identical to the pressure of liquid on the inner side of the helically wound reinforcement element(s) of the armoring layer.

The reinforcement element or elements may be of any material with a desirable high strength, preferably selected from polymer, metal, carbon fibre, fibre glass or combinations and they/it may preferably be in the form of folded strips, profiles and/or wires.

In one embodiment the fiber sensor is placed between the internal sheath and the internal armoring layer. In this embodiment it is desired that the fiber sensor preferably is not fixed to the internal sheath, because a sliding between the internal armoring layer and the internal sheath may cause damage to the fiber sensor in case it is fixed to the inner side of the internal sheath.

The fiber sensor arranged between the internal sheath and the internal armoring layer may for example be arranged such that it follows the helical windings of the reinforcement elements of the internal armoring layer or it may be arranged such that it crosses the helical windings of the reinforcement elements of the internal armoring layer. In the latter case it is desired that the fiber sensor is arranged in a supporting element shaped with an outer form with grooves corresponding to the crossing reinforcement elements.

In one embodiment the fiber sensor is at least partly integrated with said internal armoring layer, while preferably allowing a liquid in the bore to act directly on the fiber sensor. The fiber sensor may for example be applied in a groove in a reinforcement element of the internal armoring layer and optionally be fixed in the groove chemically (e.g. by glue) or mechanically. In one embodiment the fiber sensor is integrated in a reinforcement element of the internal armoring layer by being folded into the reinforcement element—in this case the reinforcement element preferably is in the form of a folded strip.

In one embodiment the fiber sensor is at least partly fixed to the internal armoring layer, while preferably allowing a liquid in the bore to act directly on the fiber sensor. The fixing of the internal armoring layer may for example be in the form of fixing at desired sites along the length of the flexible pipe e.g. every $5^{th}$ meter or less, or every $2^{nd}$ meter or less. Such fixing may be chemically (e.g. by a glue or similar) or physically (e.g. by a strap, a snap lock or similar or by both, e.g. by a fixing element glued to the internal armoring layer and snap locked to the fiber sensor or a supporting element for the fiber sensor).

The fiber sensor may be arranged in any length of the flexible pipe, for example in at least 50%, such as at least 75%, such as at least 90%, of the length of the flexible pipe. Preferably the fiber sensor is arranged in substantially the whole length of the flexible pipe.

It is generally preferred that the flexible pipe is a riser normally adapted to transfer hydrocarbons from a point further from the sea surface to a point closer to the sea surface or from a sea surface installation to another sea surface installation such as a ship or a platform. Often the pressure is higher the deeper in the sea the flexible pipe is applied and therefore the fiber sensor should preferably be arranged at least in a section of the flexible pipe adapted to be applied in depths of 1000 meters or deeper, such as 2000 meters or deeper.

In one embodiment the flexible pipe comprises a first end and a second end, the first end is adapted to lead to an offshore surface installation, such as a ship or a platform, the fiber sensor extends at least to the first end, and preferably beyond the first end of the flexible pipe, more preferably said fiber sensor comprises an optically connected analyzer arranged at a distance from the flexible pipe. In one embodiment the fiber sensor extends at least from the first end and 1000 meters or more towards the second end, such as 2000 meters or more towards the second end such as substantially along the whole length of the flexible pipe to the second end.

BRIEF DESCRIPTION OF DRAWINGS

The invention will be explained more fully below in connection with a preferred embodiment and with reference to the drawings in which:

FIG. 10 is a cross-sectional view of a section of flexible pipe comprising a part of an internal sheath and an internal armoring layer and a fiber sensor arranged there between.

The figures are schematic and simplified for clarity and merely show details which are essential to the understanding of the invention, while other details are left out. Throughout the same reference numerals are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
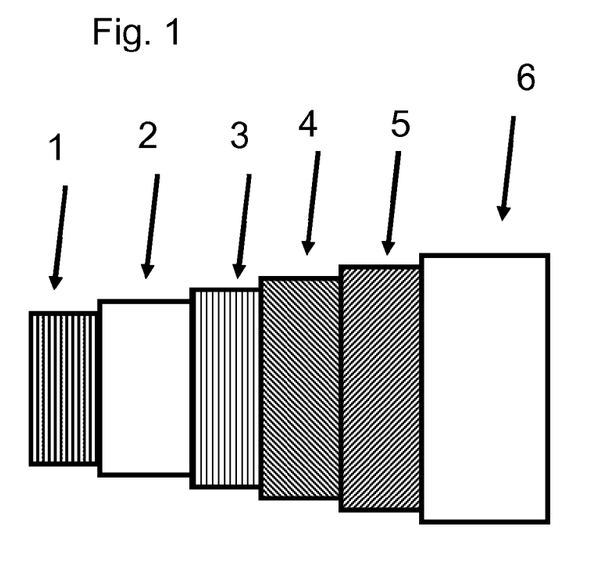
FIG. 1 is a schematic side view of a flexible pipe with a carcass.

The flexible pipe shown in FIG. 1 comprises an internal sheath 2, often also called an inner liner, e.g. of cross linked poly ethylene (PEX). Inside the internal sheath 2 the pipe comprises an internal armoring layer 1, called a carcass. On the outer side of the internal sheath 2, the flexible pipe comprises three outer armoring layers 3, 4, 5. The outer armoring layer 3 closest to the internal sheath 2 is a pressure armoring layer 3, made from profiles and/or strips wound with a short pitch and thereby at a steep angle to the centre axis of the pipe, e.g. close to 90 degrees. Around the pressure armoring layer 3, the pipe comprises a pair of cross wound tensile armoring layers 4, 5, made from wound profiles and/or strips. The tensile armoring layers 4, 5 are normally cross wound with equal or different angles of 70 degrees or less, typically 60 degrees or less, such as 55 degrees or less, such as between 20 and 55 degrees. The pipe further comprises an outer polymer layer (outer sheath) 6 protecting the armoring layer mechanically and/or against ingress of sea water. The materials used are well known in the art.

Between the internal sheath 2 and the outer sheath is provided an annulus, also called an annulus cavity. In this annulus cavity the pressure armoring layer 3 and the tensile armoring layers 4, 5 are placed. The armoring layers are not fluid tight.

The flexible pipe is a harvesting pipe for transporting oil, gas or similar fluids from a well to a collecting unit such as a sea surface installation (usually a ship or a platform). A bore defined by the internal sheath 1 (i.e. the area surrounded by the inner side of the internal sheath) provides a transportation path. The internal armoring layer 1 is placed in the bore and further a fiber sensor is arranged in the bore.

Figure 2:
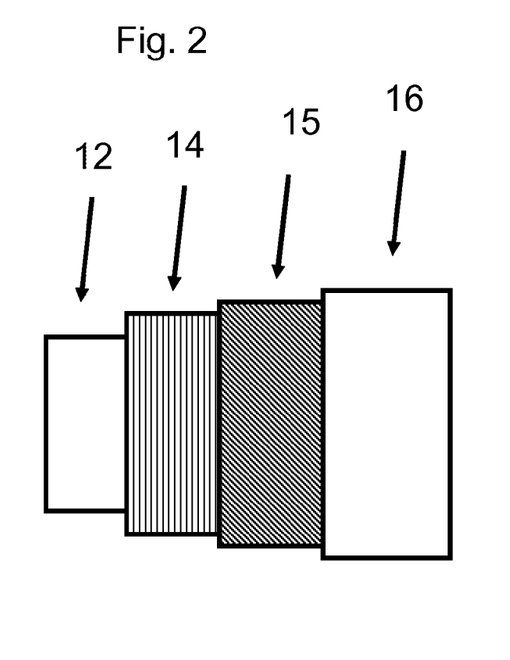
FIG. 2 is a schematic side view of a flexible pipe without a carcass.

FIG. 2 shows another pipe design. This flexible pipe comprises an internal sheath 12 and a pair of outer armoring layers, 14, 15, in the form of profiles and/or strips wound around the internal sheath 12. The two armoring layers are cross wound at an angle to the centre axis of the pipe of close to 55 degrees, typically one of the layers is wound at an angle slightly less than 55 degrees, e.g. between 52 and 55 degrees, and the other one of them is wound at an angle slightly more than 55 degrees e.g. between 55 and 57. The pipe further comprises an outer polymer layer 16 protecting the armoring layer mechanically and/or against ingress of sea water.

Between the internal sheath 12 and the outer sheath is provided an annulus, also called an annulus cavity. In this annulus cavity the outer armoring layers 14, 15 are placed. The armoring layers are not fluid tight.

Also this pipe may be a harvesting pipe as described above and comprises a bore defined by the internal sheath 12, which provides a transportation path and comprises a fiber sensor arranged therein.

Figure 3:
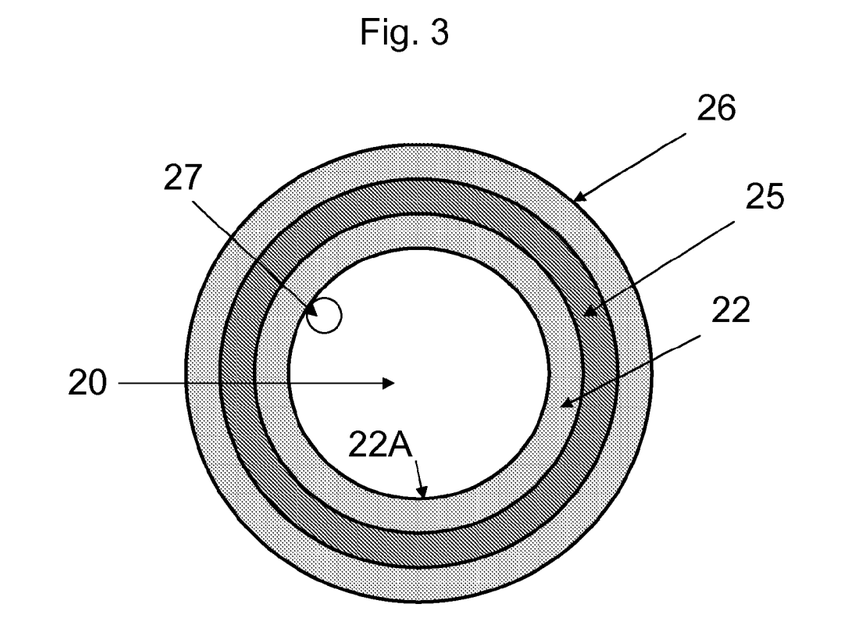
FIG. 3 is a cross-sectional view of a flexible pipe with a fiber sensor applied in a bore of a flexible pipe in contact with an inner side of an internal sheath.

FIG. 3 is a cross-sectional view of a flexible pipe of the invention. The flexible pipe comprises an internal sheath 22, an annulus 25 comprising at least one outer armor layer surrounding the internal sheath 22 and an outer sheath 26. The internal sheath 22 has an inner surface 22A and the flexible pipe has a bore 20 surrounded by said inner surface 22A of said internal sheath 22. Inside the bore 20 the flexible pipe comprises a fiber sensor 27 as described above. The fiber sensor 27 is applied in contact with the inner surface 22A and may optionally be fixed to said inner surface 22A e.g. at distinguished sites along the length of the flexible pipe. The fiber sensor 27, which is merely marked as a circle may be applied in a length direction, may be helically wound or may be applied in any other suitable configurations. The fiber sensor 27 may additionally be arranged in a supporting element as described above.

Figure 4:
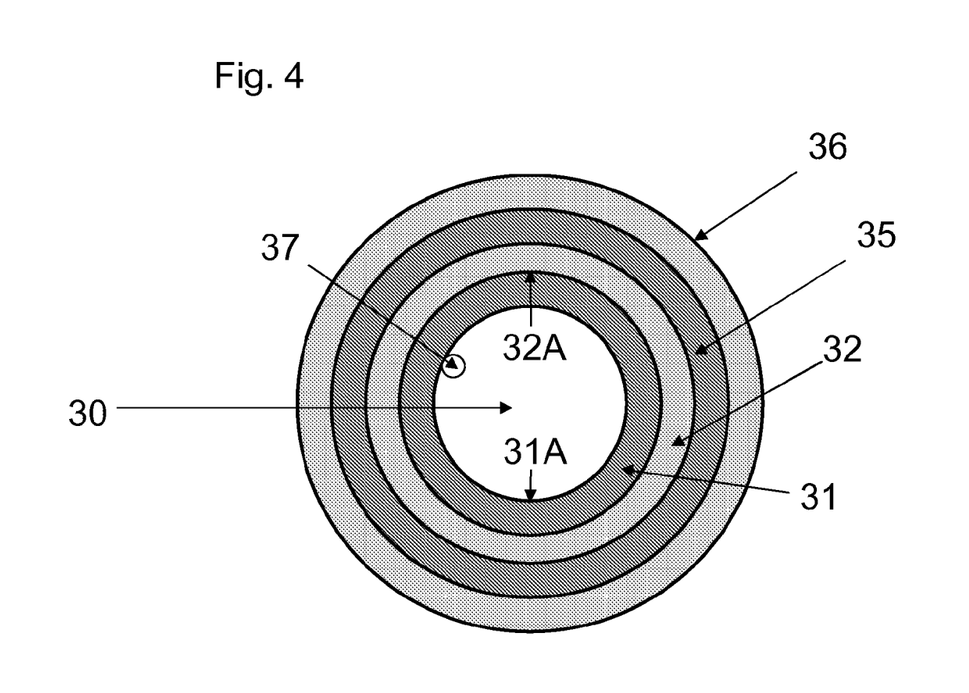
FIG. 4 is a cross-sectional view of a flexible pipe with a fiber sensor applied in a bore of a flexible pipe in contact with an inner side of an internal armoring layer.

FIG. 4 is a cross-sectional view of another flexible pipe of the invention. The flexible pipe comprises an internal sheath 32, an annulus 35 comprising at least one outer armor layer surrounding the internal sheath 32 and an outer sheath 36. The flexible pipe further comprises an internal armoring layer 31 arranged on the inside of the internal sheath 32. The internal armoring layer 31 has an inner surface 31A and the internal sheath 32 has an inner surface 32A. The flexible pipe has a bore 30 surrounded by the inner surface 32A of the internal sheath 32. Inside the bore 30 the flexible pipe comprises the internal armoring layer 31 and a fiber sensor 37 as described above. The fiber sensor 37 is applied in contact with the inner surface 31A of the internal armoring layer 31 and may optionally be fixed to said inner surface 31A of the internal armoring layer 31 e.g. at distinguished sites along the length of the flexible pipe. The fiber sensor 37, which is merely marked as a circle may be applied in a length direction, may be helically wound or may be applied in any other suitable configurations. The fiber sensor 37 may additionally be arranged in a supporting element as described above.

Figure 5:
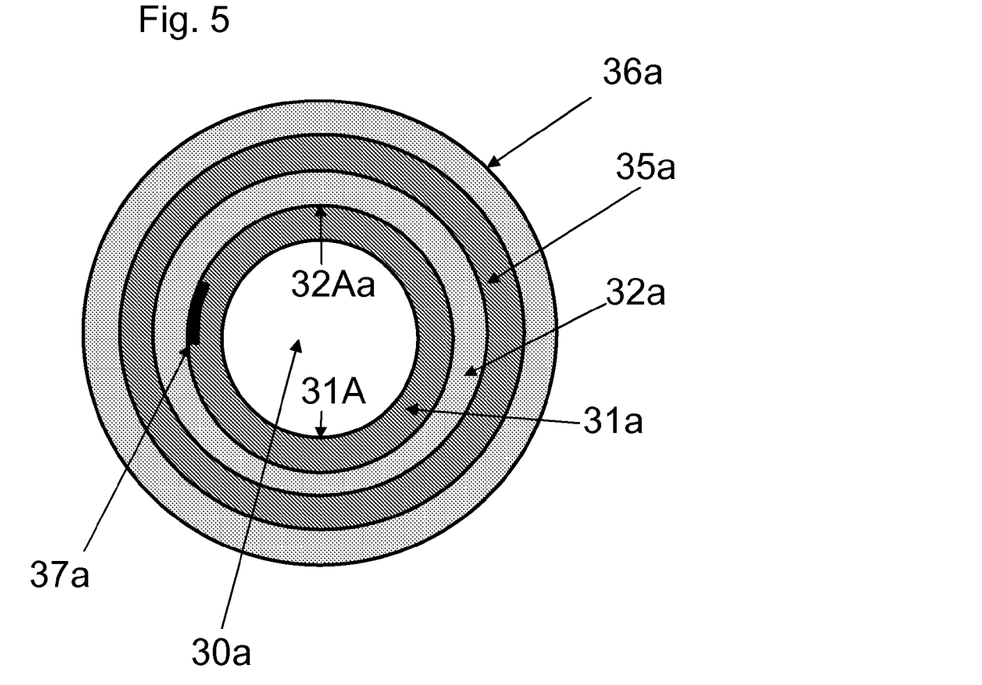
FIG. 5 is a cross-sectional view of a flexible pipe with a fiber sensor applied in a bore of a flexible pipe between an internal sheath and an internal armoring layer.

FIG. 5 is a cross-sectional view of another flexible pipe of the invention. The flexible pipe comprises an internal sheath 32a, an annulus 35a comprising at least one outer armor layer surrounding the internal sheath 32a and an outer sheath 36a. The flexible pipe further comprises an internal armoring layer 31a arranged on the inside of the internal sheath 32a.

The internal armoring layer 31a has an inner surface 31Aa and the internal sheath 32a has an inner surface 32Aa. The flexible pipe has a bore 30a surrounded by the inner surface 32Aa of the internal sheath 32a. Inside the bore 30a the flexible pipe comprises the internal armoring layer 31a and a fiber sensor 37a as described above. The fiber sensor 37a may, e.g. be applied in a tape. The fiber sensor 37a is applied in contact with the inner surface 32Aa of the internal sheath 32a and thereby is placed between the internal sheath 32a and the internal armoring layer 31a. The fiber sensor 37a is helically wound around the internal armoring layer 31a.

Figure 6:
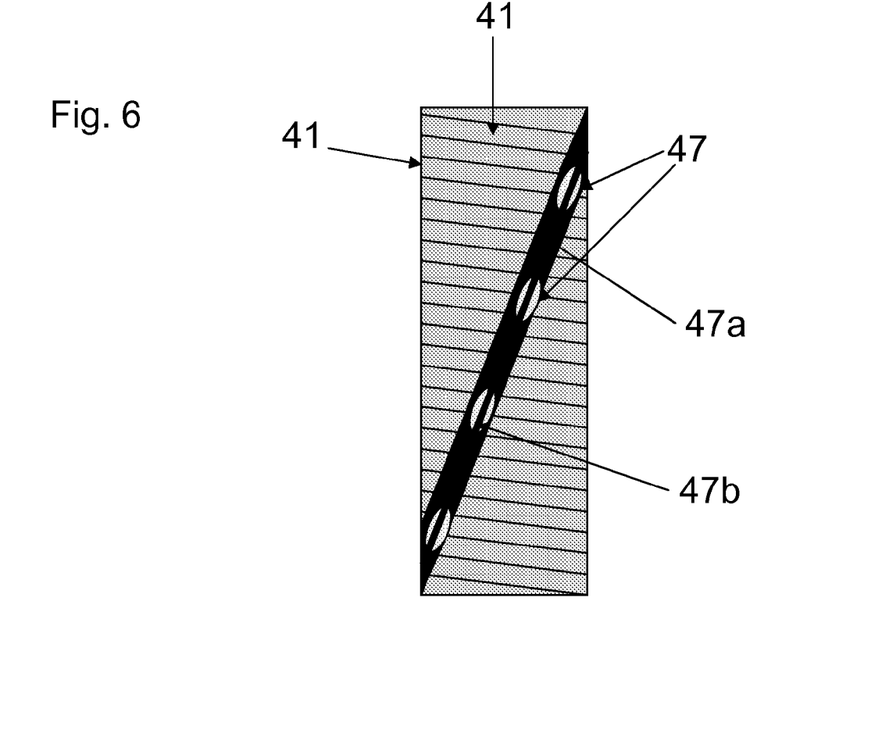
FIG. 6 is a schematic view of a section of an internal armoring layer seen from the center of the pipe, where a fiber sensor is arranged with a low pitch on an inner side of the internal armoring layer.

FIG. 6 is a schematic view of a section of an internal armoring layer 41 seen from the center of the pipe, where a fiber sensor 47 is arranged with a low pitch on an inner side 41a of the internal armoring layer 41. The fiber sensor 47 is arranged in a supporting element 47a in the form of an open carrier rod comprising holes 47b along its length for allowing a liquid to act directly on the fiber sensor 47 to determine the pressure in the liquid in the bore.

Figure 7A:
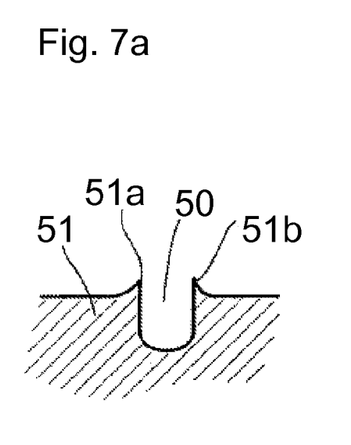
FIGS. 7a and 7b are cross-sectional views of a section of a reinforcement element of an internal armoring layer of a flexible pipe, where a fiber sensor is arranged.
Figure 7B:
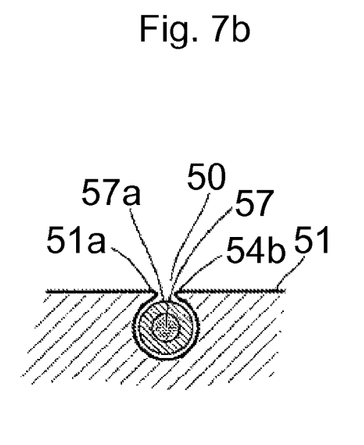

FIGS. 7a and 7b are cross-sectional views of a section of a reinforcement element 51 of an internal armoring layer of a flexible pipe, where a fiber sensor 57 is arranged. FIG. 7a shows the reinforcement element 51 prior to arranging the fiber sensor 57 therein. A channel shaped cavity 50 has been formed in the reinforcement element 51. The channel shaped cavity 50 has protruding edges 51a, 51b. The fiber sensor 57 is arranged in the cavity 50 of the reinforcement element 51 where after the protruding edges 51a, 51b are folded around the fiber sensor to fix and thereby integrate the fiber sensor 57 in the reinforcement element 51. The fiber sensor should not be completely covered by the reinforcement element, but should remain in direct contact with a liquid in the bore of the flexible pipe. The shown fiber sensor 57 is of the type comprising a pressure sensor coating 57a, which upon a change of pressure in a liquid in contact with the pressure sensitive coating 57a changes a parameter, e.g. refractive index, thickness etc., which can be optically detected by light passing in the fiber sensor 57.

Figure 8:
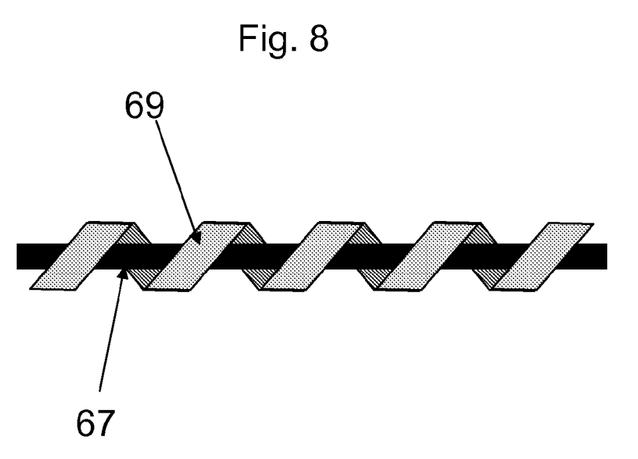
FIG. 8 is a schematic side view of a fiber sensor arranged in a supporting element in the form of a coil.

FIG. 8 shows a section of a fiber sensor 67 arranged in a supporting element in the form of a coil 69. The coil may in principle be of any material, preferably of a high strength. Preferred materials for the coil 69 comprise metals such as steel or aluminum; polymers, such as thermoset polymers preferably composite polymer comprising reinforcement fillers such as glass fibers or carbon fibers or any combinations thereof. The coiled element is a strip, but naturally it may have any other cross sectional shape e.g. round, oval or angular. In the FIG. 8, the coil 69 is a single coil—naturally the supporting element could include two or more coils or a network of coils or other forms of network providing a support and mechanical protection of the fiber sensor 67.

Figure 9A:
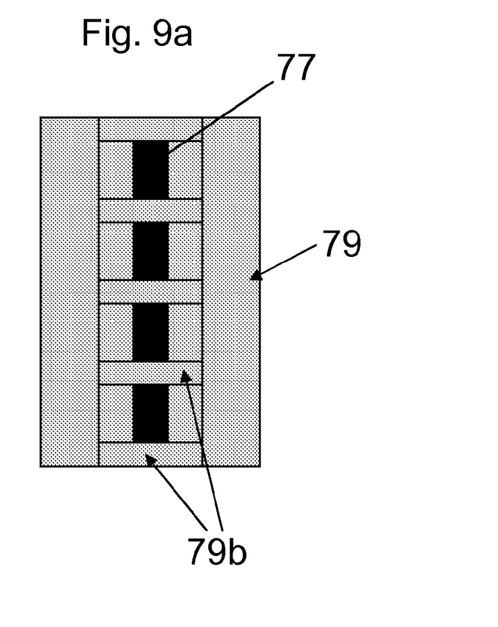
FIGS. 9a and 9b are a schematic side view and a cross-sectional view respectively of a fiber sensor arranged in a supporting element in the form of an open carrier rod.

FIG. 9a is a schematic side view of a fiber sensor 77 arranged in a supporting element in the form of an open carrier rod 79. The open carrier rod 79 has cross sectional shape as a half circle with a half circle back part and a flat front part 79b made in the form of bars 79b. The carrier rod 79 is thereby open allowing a liquid to come into direct contact with the fiber sensor 77 without reducing the pressure of the liquid.

Figure 9B:
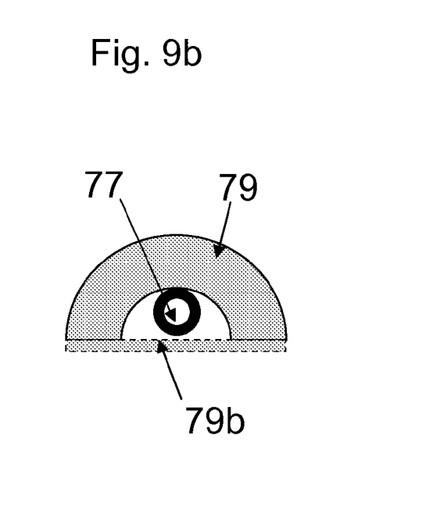

In FIG. 9b the open carrier rod 79 and the fiber sensor are seen in a cross-sectional view. The fiber sensor 77 may be any of the above discussed fiber sensors.

Figure 10:
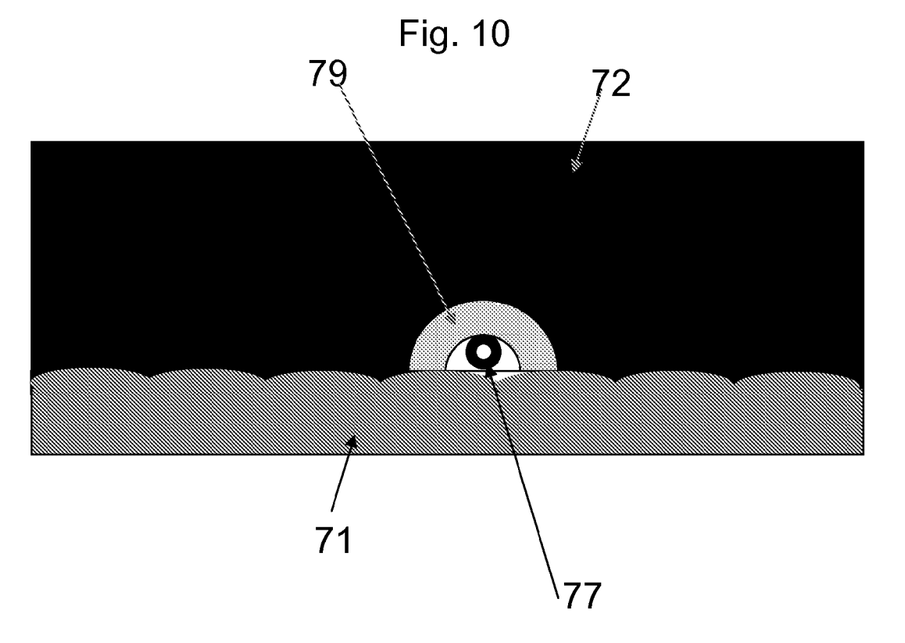

In FIG. 10 the open carrier rod 79 with the fiber sensor 77 as shown in FIGS. 9a and 9b is shown when arranged in a flexible pipe. FIG. 10 shows a section of the flexible pipe comprising a part of an internal sheath 72 and an internal armoring layer 71 with the fiber sensor 77 in the open carrier rod 79 arranged there between. The open carrier sensor 79 is arranged such that its flat side with the bars 79b is facing towards the internal armoring layer 71. As explained earlier the internal armoring layer is not liquid impermeable, but it allows liquid to pass over the layer without any substantial loss of pressure. Thereby the fiber sensor 77 will come into direct contact with a liquid in the bore of the flexible pipe to measure the pressure of the liquid.

Figure 11:
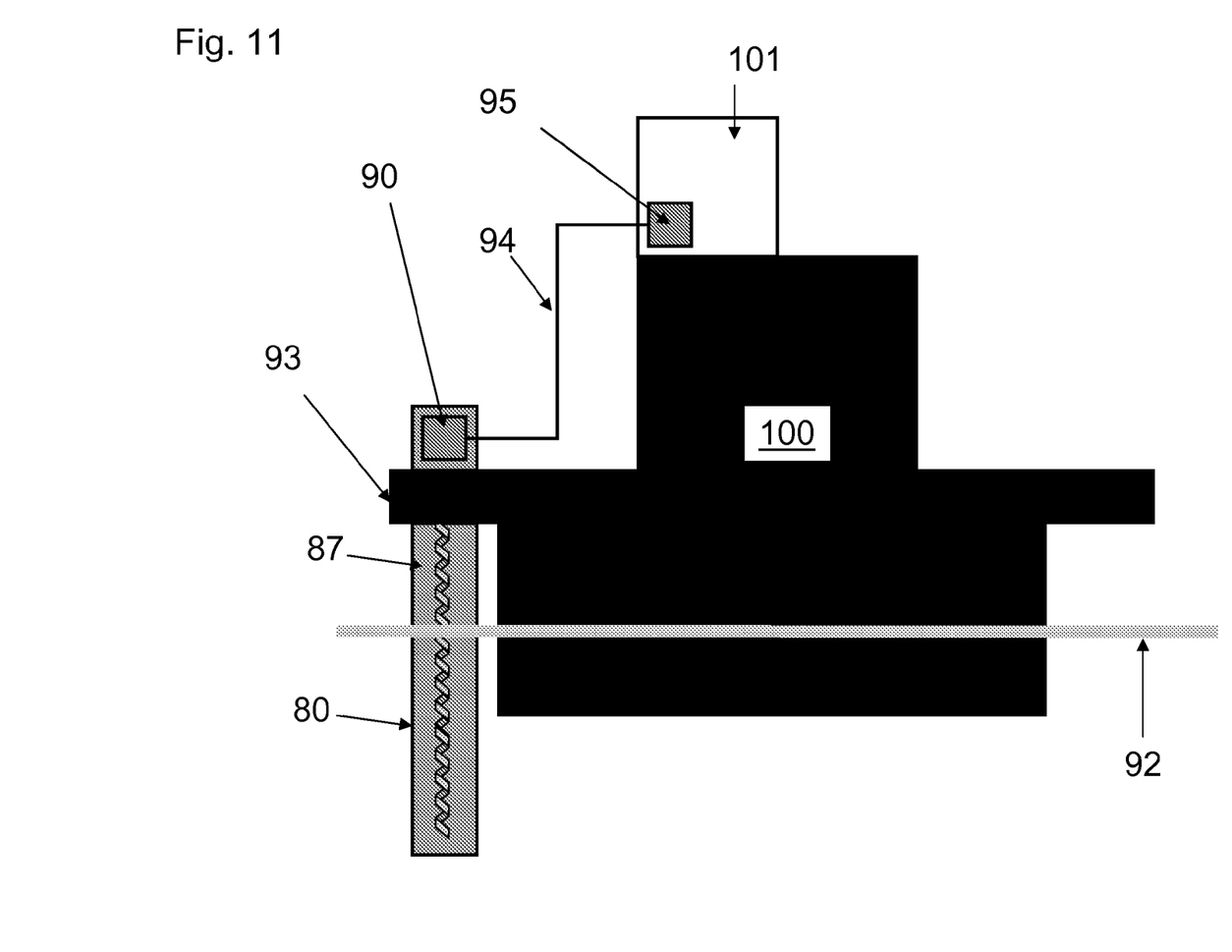
FIG. 11 is a schematic overview of a flexible pipe connected to a sea surface installation and an arrangement of a fiber sensor system with a fiber sensor at least partly arranged in the flexible pipe.

FIG. 11 is a schematic overview of a flexible pipe 80 connected to a sea surface installation 100 and an arrangement of a fiber sensor system with a fiber sensor 87 at least partly arranged in the flexible pipe 80.

The sea surface installation shown is for example a production platform 100. The production platform 100 is e.g. an offshore platform as indicated with the waterline 92. The production platform 100 comprises a control room 101 and an anchoring site 93 for securing the flexible pipe 80. The production platform 100 may preferably also comprise a not shown tank for storing the fluid pumped up from the seabed/underground via the flexible pipe 80.

The pipe system comprises the flexible pipe 80, an end fitting 90 and a remote output system 95. The fiber sensor 87 is optically connected to the remote output system 95 via fibers 94, which should preferably provide a selected—not too small—distance between the end fitting 90 of the flexible pipe 80 and the remote output system 95 to thereby ensure a reduced risk of ignition of flammable gases in and near the flexible pipe 80. The remote output system 95 is located in the control room 101 of the production platform 100.

All energy transport between the fiber sensor 87 and the remote output system 95 is provided by optical fibers.

Figure 12:
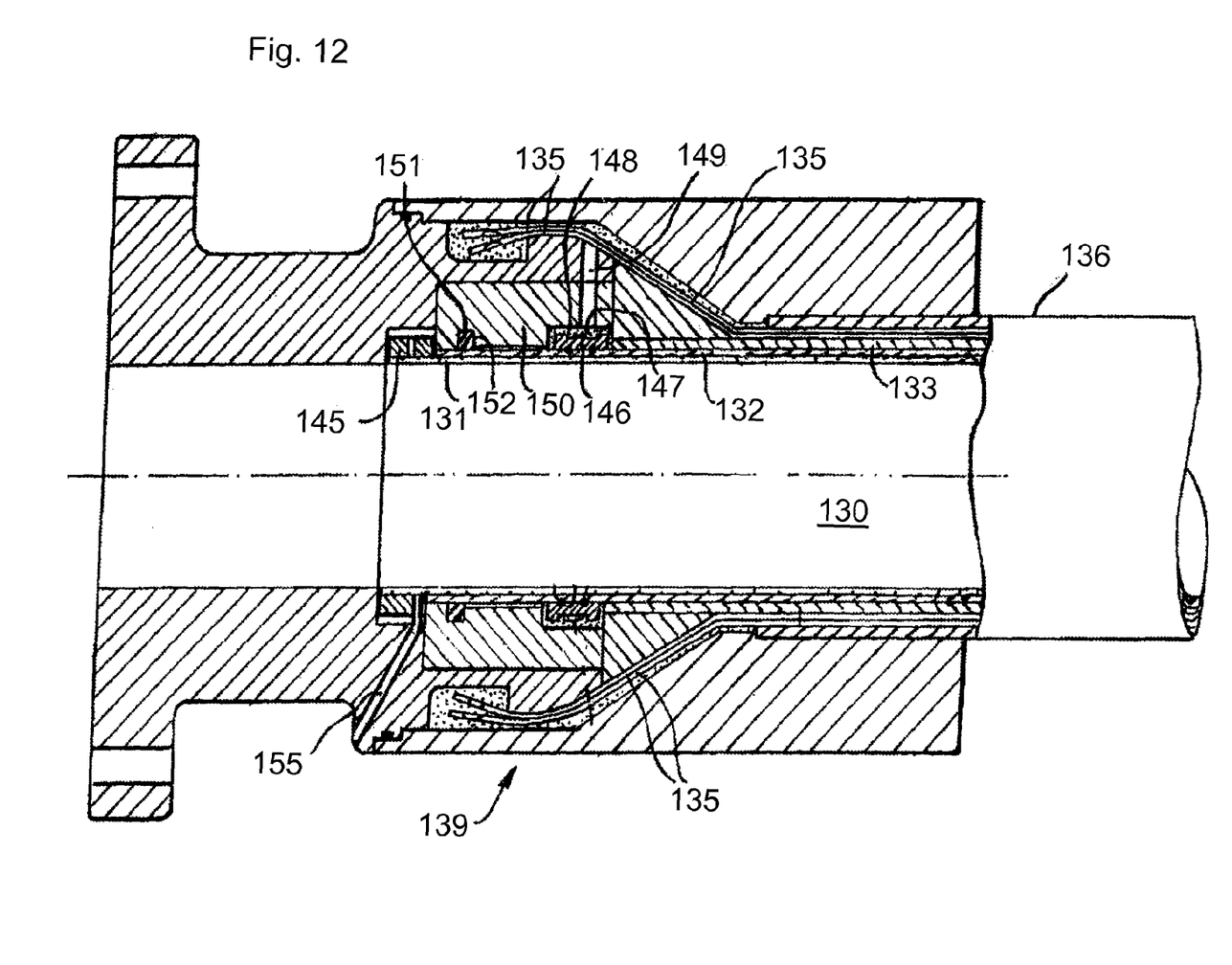
FIG. 12 is a longitudinal cross section of an assembly of an end-fitting and a flexible pipe.

FIG. 12 shows an assembly of an end-fitting 139 and the flexible pipe, as disclosed in FIG. 2 of U.S. Pat. No. 6,273,142 and the corresponding description. The flexible pipe comprises a carcass 131, a inner sealing sheath (described as a inner lining in the reference) 132, a pressure armor 133, a tensile armor layer 135, and an outer sheath 136. All layers are described in more detail in the abovementioned reference.

The carcass 131 is fastened to the end-fitting 139 by means of a lock nut 145, and to the inner sheath 131 by means of a lock ring 146 fitting into an annular groove 147 in the wall of the through opening 214. The lock ring 146 is in the embodiment shown secured in the groove 147 by a casting material 148, e.g. epoxy, which is injected through a hole 149.

A ring 150 provides a stop for the lock nut 145. In the embodiment shown a sealing ring 151 for tightening the end-fitting 139 and the inner sheath 131 is fitted into a groove 152 in the ring 150. After the end-fitting 139 has been attached to the flexible pipe, the sealing ring 151 presses the inner sheath 131 against the carcass 131 with a significant force. This force would severely damage or even cut a fiber sensor (not shown) situated between the carcass 131 and inner sheath 132 lead through this region of the pipe, without special precautions. Therefore, the path of the fiber sensor is changed at least in a region around the sealing ring 151, such that the fiber sensor follows the winding angle of the carcass element(s) in this region. The carcass 131 is commonly made of an interlocking structure made from metallic strips. This construction of the carcass 131 tends to leave a recess on the outside of the carcass, in a region corresponding to the joint of two neighboring strips or of two neighboring windings of a single strip (See FIG. 1 of U.S. Pat. No. 6,273,142). The fiber sensor may be inserted in this recess and thus be protected from crushing by the inner sheath 132 as the sealing ring 151 is tightened in place. In this way, the fiber sensor may safely be guided to the region of the pipe between the sealing ring 151 and the lock nut 145. From here, the fiber sensor is guided through a guide tube 155 that is sealed to the end-fitting by conventional means, e.g. by O-rings or the like. After the fiber sensor has been guided through the guide tube 155, the guide tube 155 is sealed off with a suitable sealant, such as epoxy, which is capable of sustaining the potentially high pressure and chemically aggressive liquids in the bore of the pipe.

Some preferred embodiments have been shown in the foregoing, but it should be stressed that the invention is not limited to these, but may be embodied in other ways within the subject-matter defined in the claims.

What is claimed is:

1. An unbonded flexible pipe comprising an internal sheath, at least one armor layer surrounding said internal sheath and a bore defined by said internal sheath, the flexible pipe further comprising a fiber sensor arranged in said bore, the fiber sensor is an optical fiber sensor, wherein a protecting element is arranged around said fiber sensor, said protecting element allowing a liquid fluid and/or gas fluid flowing in said bore to act directly on said fiber sensor, wherein said flexible pipe is a riser.

2. The flexible pipe as claimed in claim 1, wherein said fiber sensor is a pressure fiber sensor.

3. The flexible pipe as claimed in claim 1, wherein said fiber sensor comprises at least one grating.

4. The flexible pipe as claimed in claim 1, wherein said fiber sensor is a Bragg grating fiber sensor.

5. The flexible pipe as claimed in claim 1, wherein said fiber sensor is a spectrally based fiber sensor.

6. The flexible pipe as claimed in claim 1, wherein the fiber sensor further comprises a sensing fiber, for sensing the property to be determined, and a protective coating surrounding said sensing fiber.

7. The flexible pipe as claimed in claim 6, wherein the protective coating and the sensing fiber together form a tape having an elongated outer cross section with a high aspect ratio between a shortest length direction and a longest length direction.

8. The flexible pipe as claimed in claims 7, wherein the tape comprises two sides along the longest length direction, said two sides being substantially parallel over at least a part of the longest length direction.

9. The flexible pipe as claimed in claim 7, wherein the tape has a thickness of from about 100% to about 2000% of an outer dimension of the sensing fiber.

10. The flexible pipe as claimed in claim 7, wherein the tape has a width from about 10 to about 200 times the thickness of said tape.

11. The flexible pipe as claimed in claim 1, wherein the fiber sensor comprises a pressure sensitive coating.

12. The flexible pipe as claimed in claim 1, wherein the fiber sensor provides or is a part of a distributed pressure sensing system.

13. The flexible pipe as claimed in claim 1, wherein said flexible pipe further comprises a distributed temperature sensor.

14. The flexible pipe as claimed in claim 1, wherein said fiber sensor arranged in said bore comprises a temperature sensor and a pressure sensor.

15. The flexible pipe as claimed in claim 1, wherein said fiber sensor arranged in said bore is configured to be in physical contact with a liquid flowing in said bore.

16. The flexible pipe as claimed in claim 1, wherein said fiber sensor arranged in said bore is placed in an open carrier rod comprising a plurality of orifices for allowing a liquid in the bore acting directly on the fiber sensor.

17. The flexible pipe as claimed in claim 1, wherein said fiber sensor is placed in contact with an inner side of said internal sheath.

18. The flexible pipe as claimed in claim 1, wherein said flexible pipe comprises an internal armoring layer placed in said bore on the inner side of said internal sheath.

19. The flexible pipe as claimed in claim 18, wherein said fiber sensor is placed between said internal sheath and said internal armoring layer.

20. The flexible pipe as claimed in claim 18, wherein said fiber sensor is placed on the inner side of said internal armoring layer.

21. The flexible pipe as claimed in claim 18, wherein said fiber sensor is at least partly integrated with or fixed to said internal armoring layer, while allowing a liquid in the bore to act directly on the fiber sensor.

\* \* \* \* \*